United States Patent
Davis et al.

(10) Patent No.: US 6,848,675 B2
(45) Date of Patent: Feb. 1, 2005

(54) ELECTRICAL HOIST DRIVE SYSTEM

(75) Inventors: O'Neal Wright Davis, Pike Road, AL (US); Terry O'Neal Davis, Pike Road, AL (US)

(73) Assignee: Production Automation, Inc., Montgomery, AL (US)

(*) Notice: Subject to any disclaimer, the term of this patent is extended or adjusted under 35 U.S.C. 154(b) by 23 days.

(21) Appl. No.: 10/175,082

(22) Filed: Jun. 20, 2002

(65) Prior Publication Data

US 2003/0234389 A1 Dec. 25, 2003

(51) Int. Cl.$^7$ .................................................. B66D 1/14
(52) U.S. Cl. ...................................... 254/340; 254/342
(58) Field of Search ................................ 254/394, 316, 254/340, 342

(56) References Cited

U.S. PATENT DOCUMENTS

| | | | |
|---|---|---|---|
| 2,626,375 A | * | 1/1953 | Fishcer .......................... 318/67 |
| 3,675,900 A | * | 7/1972 | Barron et al. ................. 254/270 |
| 3,770,143 A | | 11/1973 | Breitbach |
| 3,780,884 A | | 12/1973 | Jones |
| 3,844,422 A | | 10/1974 | Smith et al. |
| 3,946,880 A | | 3/1976 | Schmitt |
| 3,954,190 A | | 5/1976 | Howard et al. |
| 3,974,922 A | | 8/1976 | Selusnik et al. |
| 4,026,422 A | | 5/1977 | Leenaards |
| 4,058,225 A | | 11/1977 | Janson |
| 4,067,456 A | | 1/1978 | Schmitt |
| 4,127,264 A | | 11/1978 | Fayolle |
| 4,132,387 A | * | 1/1979 | Somerville et al. .......... 254/340 |
| 4,162,016 A | | 7/1979 | Schmitt |
| 4,195,959 A | | 4/1980 | Schmitt |
| 4,197,046 A | | 4/1980 | Shank |
| 4,214,848 A | | 7/1980 | Verwey et al. |
| 4,239,433 A | | 12/1980 | Hanson |
| 4,298,305 A | | 11/1981 | Neth |
| 4,316,693 A | | 2/1982 | Baxter et al. |
| 4,557,656 A | | 12/1985 | Ouellette |
| 4,861,226 A | | 8/1989 | Dorner et al. |
| 5,062,613 A | * | 11/1991 | Petrachkoff ................... 266/44 |
| 5,548,198 A | * | 8/1996 | Backstrand ................. 318/799 |
| 5,584,207 A | * | 12/1996 | Paul et al. .................. 74/89.22 |
| 5,900,597 A | * | 5/1999 | Fernkas ....................... 187/297 |
| 6,082,523 A | | 7/2000 | Weeks |
| 6,371,720 B1 | | 4/2002 | Ouellette |

* cited by examiner

*Primary Examiner*—Emmanuel Marcelo
(74) *Attorney, Agent, or Firm*—Hunton & Williams LLP

(57) ABSTRACT

The invention provides a hoist drive system for controlling the position of a hoist platform in a palletizer. In an embodiment of the invention, a hoist drive system comprises two electrical motors with dual output shafts. One motor may have an encoder for taking measurements relating to the rotation of the motor. A common shaft with a spring set safety brake ties the motors together. The two motors may be flux vector motors controlled with input from the encoder. The motors drive two gearboxes, thereby enabling vertical displacement of a hoist platform coupled to the drive system.

46 Claims, 4 Drawing Sheets

ELECTRICAL HOIST DRIVE SYSTEM

FIELD OF INVENTION

The present invention relates to hoisting, and more particularly to an electrical hoist drive system for a palletizer.

DESCRIPTION OF RELATED ART

Many goods are packaged in shipping containers such as boxes and stacked on pallets for transportation from a manufacturer to a user or distributor. Palletizing is automatically stacking goods onto a pallet typically constructed of wood. Goods are stacked onto pallets as layers separated by paperboard slipsheets. The layers of goods and the slipsheets on which the layers rest are secured on the pallet by banding, plastic sheet wrap, or by other conventional methods. The pallet facilitates the transportation of a significant number of goods from a manufacturer through distribution and ultimately to the end user of the goods.

Generally, manual loading of pallets is slow, requires strenuous physical labor, and is relatively cost inefficient. A number of different types of palletizing machines (herein referred to as palletizers) have been developed that quickly perform the function of loading and/or unloading pallets. Examples of palletizers are described in U.S. Pat. Nos. 2,774,489; 3,780,884; 3,844,422; 3,954,190; 4,058,225; 4,197,046; 4,214,848; 4,557,656; 4,861,226; 5,395,209; 5,868,549; 5,961,275; 6,164,900; and 6,371,720; each of which is incorporated herein by reference in its entirety.

FIG. 1 illustrates a conventional in-line palletizer 100 comprising many features found in the prior art. Generally, palletizer 100 includes an object infeed section A, a hoist section B, and an object outfeed section C. In order to simplify the explanation of the construction and operation of a conventional palletizer, the figure has been simplified by deleting many of the intricate component parts of the palletizer, examples of which are disclosed in the above-listed patents, which enable a palletizer to operate in a manner as described herein. Although palletizer 100 is shown and described as palletizing objects such as case goods, it should be understood that "objects" is intended to mean any type of goods that can be transported in pallet loads.

The sections of palletizer 100 are supported by a framework 110. At the object infeed section A, framework 110 supports one end of a supply conveyor 120, which can be any type of conventional supply conveyor such as a belt or roller conveyor employed to transport case goods 125 onto a forming conveyor 130. Forming conveyor 130 typically comprises one or more case turners, mini stops, and side pushers, and like devices to orient multiple cases 125 into a layer to be loaded onto a pallet 127 in hoist section B. After a layer of cases 125 has been formed, the layer of cases is placed onto a stripper or apron 140, which draws the layer into proper place for loading. The layer of cases is compressed on all four sides by a set of flight bars 142 as apron 140 is stripped from beneath, squarely depositing the layer onto an empty pallet 127 positioned under by a hoist platform 150. After the layer has been placed onto hoist platform 150, hoist platform 150 is lowered by a height approximately equal to the height of one layer of cases 125 plus suitable clearance needed to position another layer of cases 125 on top if necessary. When another layer of cases 125 is ready for loading by apron 140, hoist platform 150 lifts up until the top of the previous layer is just below the apron 140. Apron 140 then opens placing the new layer on top of the previous layer. This process is repeated until a full pallet load is completed, at which time hoist platform 150 travels down to feed the full load to an outfeed conveyor 160 at outfeed section C. Once the full load has cleared hoist platform 150, an empty pallet 127 is conveyed via a pallet input conveyor 170 to hoist platform 150 and the entire loading process is repeated.

Several sensors (not shown) are mounted at key positions within palletizer 100 to detect the movement of the component parts described herein as well as the movement of empty pallets, layers of objects being loaded onto the pallets, and loaded pallets. The information acquired by these sensors is monitored by a control unit (not shown), which controls the systematic operation of the palletizer components. Various different types of conventional sensors can be employed. The control of palletizer 100 implemented by control unit via the sensors is apparent to one of ordinary skill in the art.

FIG. 2 illustrates a conventional hoist 200 for vertically displacing hoist platform 150 (not shown) in hoist section B of palletizer 100. Hoist 200 comprises a motor 210, which is mounted to frame 110. A rotatable shaft 220 is affixed to frame 110 by one or more supports 222. Motor 210 is connected to shaft 220 by a drive belt 230. At least one mechanical brake 224 is provided on shaft 230 to control rotational movement. Dual gearboxes 240 each with a coupling 242 is provided to convert rotational motion of shaft 220 into a vertical displacement of hoist platform 150. In operation, motor 210 under the direction of a control unit (not shown) drives shaft 220 via drive belt 230, which in turn raises or lowers hoist platform 150 via gearboxes 240. Brake 224 positions hoist shaft 220 into proper place by slowing and halting the movement of shaft 220. One primary drawback of such a system is the development of imprecision in positioning hoist platform 150, a problem which tends to increase over the lifetime of the mechanical parts, e.g., brake 224 and drive belt 230. For example, belts wear, slip, and break, and mechanical brakes wear and slip; thereby causing positioning error leading to poor hoist platform control.

SUMMARY OF THE INVENTION

The present invention overcomes these and other deficiencies of the related art by providing a brakeless flux vector hoist drive system employing dual motors linked together via a shaft. Particularly, the inventive concept eliminates the need for drive belts and a mechanical brake in the positioning of a hoist platform.

The present invention discloses the use of multiple motors and gearboxes, which are mechanically linked via a shaft for positive drive of a hoist or elevator platform. An encoder is disposed on the shaft or within a motor to provide rotational measurement and feedback used for positioning control of the hoist platform. Positioning is controlled through operation of the dual motors themselves and not a brake. Nevertheless, a mechanical brake can be incorporated for safety in the event that power is lost to the motors.

In an embodiment of the invention, a hoist drive system comprises two electrical motors with dual outputs. A common shaft with a spring set safety brake links the motors together. For example, as one motor rotates clockwise, the other motor rotates counter-clockwise. One motor comprises an encoder for providing rotational measurement and feedback. A flux vector motor controller with input from the encoder controls the operation of the two motors. The two motors drive two hollow bore gearboxes, which in turn vertically displace a hoist platform.

In another embodiment of the invention, a hoist system comprises a first motor, an encoder, and a control unit. The first motor comprises an output axle connected to an input of a gearbox that is in-turn coupled to a hoist platform. The hoist platform is vertically displaced upward or downward by operation of the motor. The control unit stops the motor based on input provided by the encoder. A second motor can be provided with a shaft connecting the first motor to the second motor. The shaft is rotatably driven by the first and second motors. The first and second motors are preferably direct drive motors, stoppage of which positions the platform into a static position.

An advantage of the invention is that mechanical brakes and drive belts have been eliminated in the positioning of a hoist platform in a palletizer. Accordingly, hoist positioning and control problems are minimized, if not entirely eliminated, thereby leading to improve performance and cost savings.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE PREFERRED EMBODIMENTS

Figure 1:
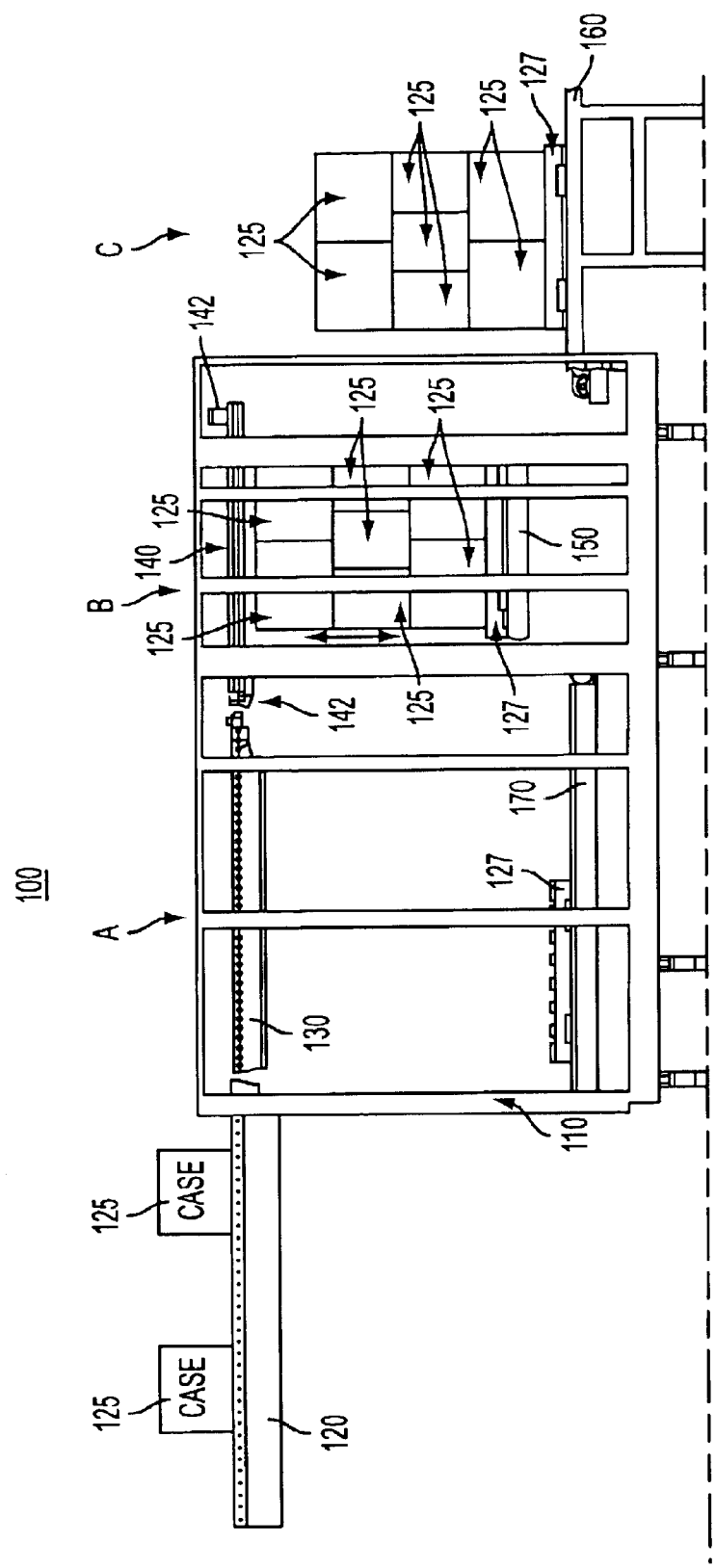
FIG. 1 illustrates a conventional in-line palletizer.
Figure 2:
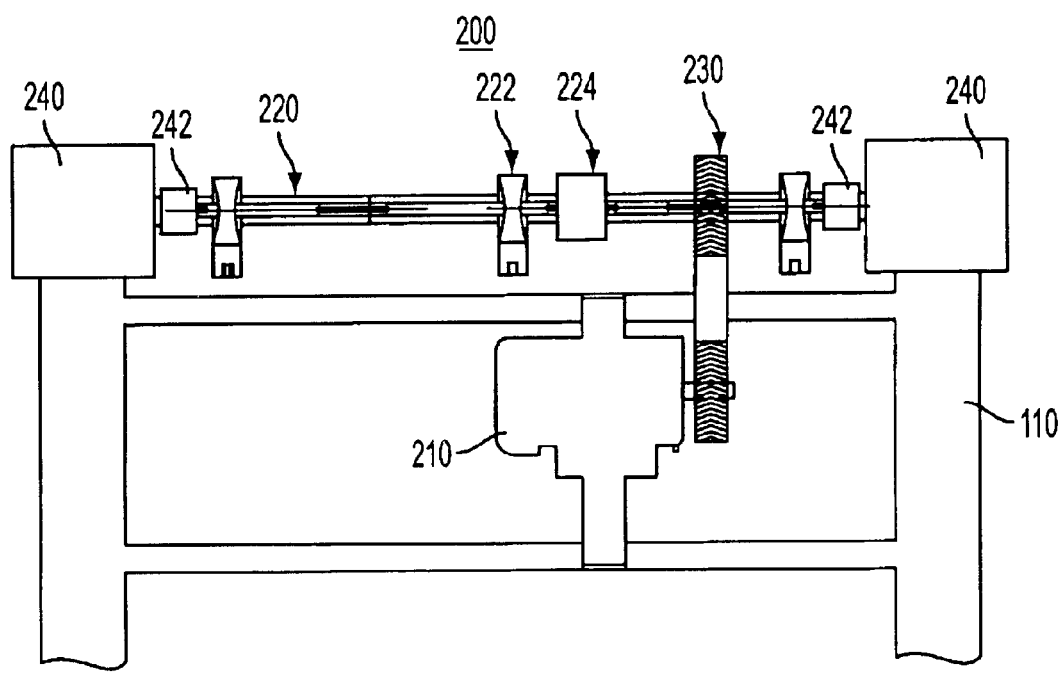
FIG. 2 illustrates a conventional hoist system for vertically displaying a hoist platform.
Figure 3:
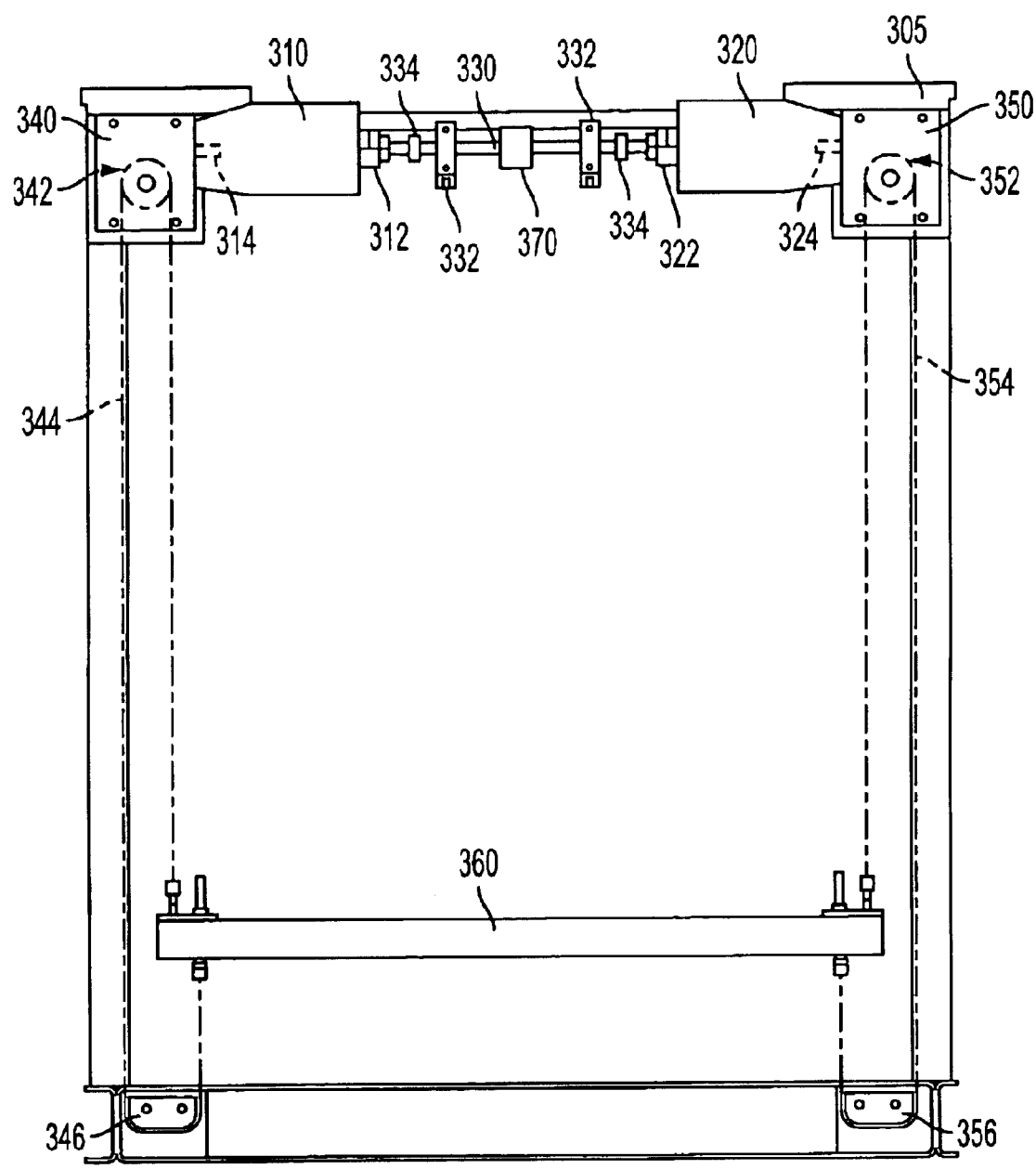
FIG. 3 illustrates a hoist drive system according to an embodiment of the invention.
Figure 4:
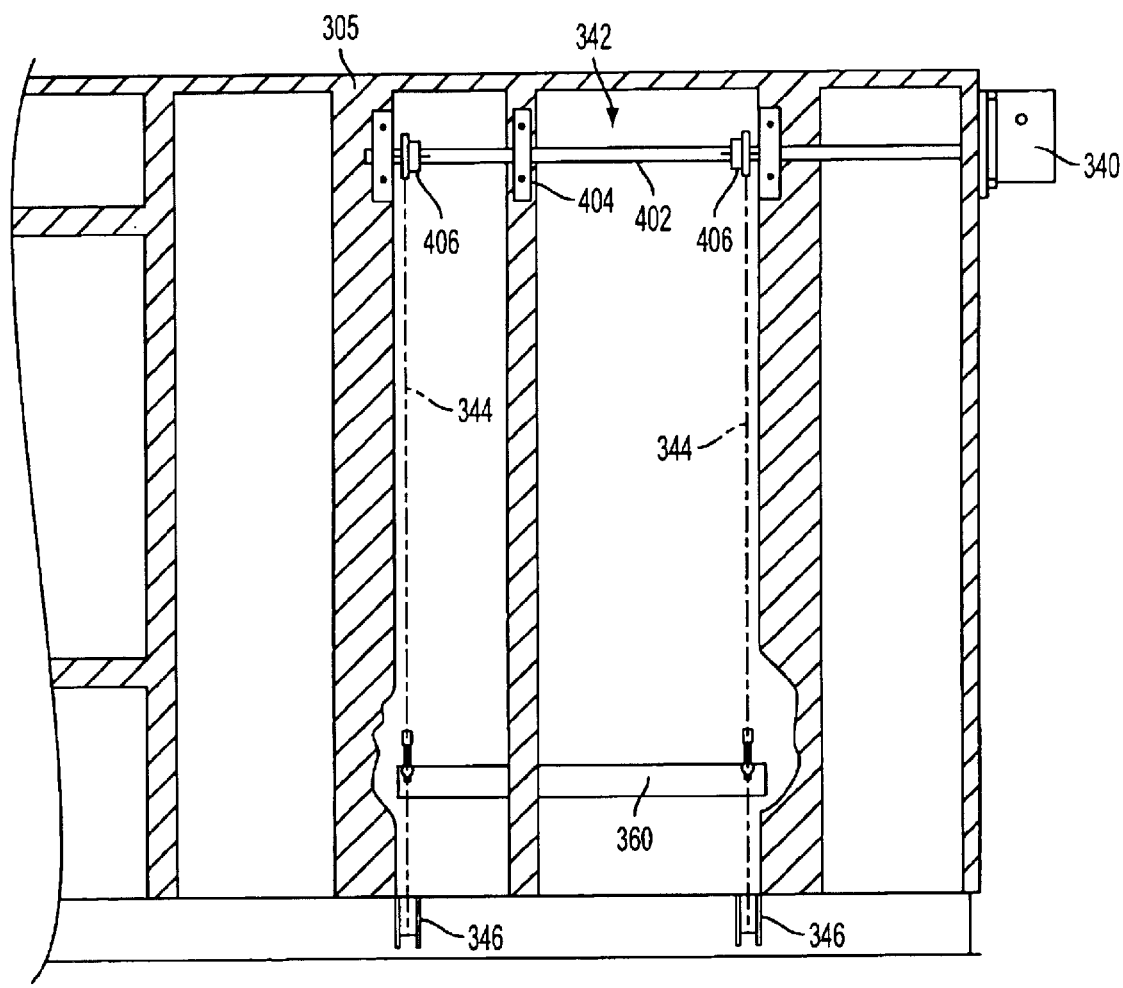
FIG. 4 illustrates a side view of the hoist drive system depicted in FIG. 3.

Preferred embodiments of the present invention and their advantages may be understood by referring to FIGS. 3–4, wherein like reference numerals refer to like elements, and are described in the context of an electrical hoist drive system for a palletizer. Nevertheless, the inventive concept can be adapted for systems other than palletizers, which require vertical hoisting of a platform, lift, or other load bearing structure.

FIG. 3 illustrates a hoist drive system 300 according to an embodiment of the invention. Hoist drive system 300 is affixed to a palletizer frame 305 as shown. Particularly, hoist drive system 300 comprises a first motor 310 and a second motor 320 linked by a shaft 330. Although not absolutely required, shaft 330 is preferably connected to or supported by frame 305 via one or more bearing systems 332, which constrain shaft 330 from moving in a vertical or horizontal direction relative to frame 305. In a preferred embodiment, motors 310 and 320 are flux vector drive motors having dual outputs on opposite ends. For example, motor 310 comprises a shaft output 312 on one end and a motor output 314 on another end. Likewise, motor 320 comprises a shaft output 322 and a motor output 324 disposed along a motor axle. Outputs 312 and 314, or outputs 322 and 324 can be integrated along a single motor axle. Shaft outputs 312 and 322 respectively couple motors 310 and 320 to shaft 330. Shaft outputs 312 and 322 can be any type of conventional shaft coupling, the identification and implementation of which is apparent to one of ordinary skill in the art.

Motor outputs 314 and 324 are respectively linked to gearboxes 340 and 350 to enable the conversion of the rotational motion of shaft 330 into a vertical motion of a hoist platform 360. Particularly, gearbox 340 or 350 comprises an input (not shown), preferably a c-faced input, which is respectively connected to motor output 314 or 324, thereby directly coupling motors 310 and 320 to respective gearboxes 340 and 350. Gearboxes 340 and 350 each comprises a gearbox output 342 or 352. Gearbox outputs 342 or 352 preferably comprise a number of sprocket wheels, which are coupled to hoist platform 360 via links 344 or 354. In a preferred embodiment, links 344 and 354 are metal chains designed to mesh with the sprockets of gearbox outputs 342 or 352 to prevent slippage. Links 344 and 354 are connected to platform 360 via conventional means, the identification and implementation of which is apparent to one of ordinary skill in the art. For example, each end of link 344 or 354 is respectively fastened to a top side or bottom side of platform 360 as shown. Guides 346 and 356 are disposed on a bottom portion of frame 305 to facilitate proper travel of links 344 and 354 and provide stability to hoist platform 360. Other types of conventional coupling systems can be substituted to connect gearboxes 340 and 350 to platform 360, e.g., a pulley or belt system, the implementation of which is apparent to one of ordinary skill in the art.

One or more encoders 334 are disposed on shaft 330 to provide rotational measurements and feedback to a control unit (not shown). In an alternative embodiment of the invention, encoder 334 is built into either one or both of motors 310 and 320, thereby alleviating the need for affixing an encoder directly onto shaft 330. Encoder 334 outputs a total number of revolutions or an angular frequency that shaft 330 undergoes for input to the control unit, which adjusts the operation of motors 310 and 320 to position hoist platform 360. Because the vertical position of hoist platform 360 is directly dependent on the rotation of shaft 330 based on the known gear ratio of gearboxes 340 and 350, the control unit can determine hoist platform's 360 change in vertical position from the rotational changes of shaft 330. As such, the control unit can control the operation of motors 310 and 320 to accurately position hoist platform 360 as desired. For example, the control unit instructs motors 310 and 320 to respectively rotate clock or counter clockwise at a given speed. In an embodiment of the invention, the control unit can be programmed to enable motors 310 and 320 to accelerate and decelerate for soft starts and stops of platform 360.

Brake 370 is preferably provided on shaft 330 as a safety precaution in case power is lost to motors 310 and 320; thereby preventing sudden or dramatic vertical displacement of platform 360. In a preferred embodiment, brake 370 is an air spring brake, the implementation of which is apparent to one of ordinary skill in the art. Brake 370 is only used for safety precautions and not for positioning platform 360 during normal operation. In an another embodiment of the invention, brake 370 can be implemented in one or both of motors 310 and 320, or within one or both of gearboxes 340 and 350.

Gearboxes 340 and 350 facilitate the conversion of shaft 330 rotation into a rotational motion having a rotational axis not parallel, and preferably perpendicular, to the rotational axis of shaft 330. For example, shifting the axis of rotation ninety (90) degrees enables all four corners of a square or rectangular hoist platform 360 to be connected to hoist system 330. Such a feature is shown in FIG. 4, which shows a side view of hoist system and particularly illustrates gearbox 340 and gearbox output 342. In a preferred embodiment of the invention, gearbox output 342 comprises a shaft 402 extending from gearbox 340. Shaft 402 is preferably connected to or supported by frame 305 via one or more bearing systems 404, which constrains movement in a vertical or horizontal direction relative to frame 305. Gearbox output 342 comprises one or more sprocket wheels 406 disposed on shaft 402, which are coupled to hoist platform 360 via links 344. As shown, gearbox 340 lifts two corners of platform 360. Likewise, gearbox 350 (not shown) lifts the two other corners (not shown) of platform 360. Gearboxes 340 and 350, each having its own input motor 310 or 320 linked together by shaft 330, keep the four corners of platform 360 level.

In a related embodiment of the invention, a hoist drive system comprises a single motor instead of dual motors. In this embodiment, the single motor comprises dual outputs each connected to inputs of gearboxes 340 and 350. For example, each end of a motor axle extending through the motor is connected to a shaft input of gearboxes 340 and 350. In operation, the single motor directly drives gearboxes 340 and 350, and hence hoist platform 360, control of which is implemented as described in the above embodiments.

With no mechanical slip in the drive system, an empty pallet can be risen by platform 360 at a desired speed. Likewise, a pallet with a number of layers of goods can be hoisted or lowered at any desired speed. In operation, the hoist is stopped and held in position by the control unit directing the motors to halt and hold at zero speed. To change the position of hoist platform 360 to a preprogrammed vertical position, the control unit instructs the motors to run at a programmed speed and acceleration. Accordingly, the motors accelerate up to speed for a specific programmed point or time. A stop command with a zero speed is sent by the control unit, which commands the motors to decelerate to zero speed and hold that load/hoist in position. Positioning of hoist platform 360 is accomplished without the use of mechanical brakes or belts. The motors and control unit position the hoist platform 360 in the same position each time.

Although the invention has been particularly shown and described with reference to several preferred embodiments thereof, it will be understood by those skilled in the art that various changes in form and details may be made therein without departing from the spirit and scope of the invention as defined in the appended claims.

We claim:

1. A hoist drive system comprising:
    a first motor;
    a second motor; and
    a shaft linking a first output of said first motor to a first output of said second motor, wherein said first and second motor each comprise a second output, said second outputs coupled to a hoist platform via a coupling system.

2. The hoist drive system of claim 1, wherein said coupling system comprises:
    a first gearbox, wherein an input of said first gearbox is connected to said second output of said first motor; and
    a second gearbox, wherein an input of said second gearbox is connected to said second output of said second motor, said first and second gearboxes converting rotation of said second outputs into respective first and second rotational motions having axes of rotation not parallel to an axis of rotation of said shaft.

3. The hoist drive system of claim 2, wherein said first and second axes of rotation not parallel to an axis of rotation of said shaft are perpendicular to said axis of rotation of said shaft.

4. The hoist drive system of claim 2, further comprising:
    a first couple connected to an output of said first gearbox; and
    a second couple connected to an output of said second gearbox, wherein said first and second couples convert said first and second rotational motions into a vertical displacement of said hoist platform, said first and second couples each comprising:
    a sprocket wheel, and
    a chain, wherein said chain links said sprocket wheel to said hoist platform.

5. The hoist drive system of claim 1, further comprising a safety brake.

6. The hoist drive system of claim 1, further comprising an encoder, wherein said encoder provides measurements relating to the rotation of said shaft.

7. The hoist drive system of claim 6, wherein said encoder is disposed on said shaft.

8. The hoist drive system of claim 6 further comprising a control unit, wherein said control unit controls operation of said first and second motors, and wherein said control unit acquires said measurements from said encoder.

9. The hoist drive system of claim 8, wherein said control unit starts and stops operation of said first and second motors based on said measurements.

10. The hoist drive system of claim 8, wherein said control unit is programmed to instruct said first and second motors to accelerate and decelerate for soft starts and stops of said hoist platform.

11. A hoist drive system comprising:
    a first motor, wherein said first motor comprises an output axle connected to an input of a gearbox, said gearbox coupled to a hoist platform;
    an encoder which provides measurements relating to the rotation of said first motor;
    a control unit, wherein said control unit acquires said measurements from said encoder, said control unit controls operation of said first motor to vertically position said hoist platform, said control unit using said measurements as feedback for controlling the vertical position of said hoist platform.

12. The hoist drive system of claim 11, further comprising:
    a second motor, and
    a shaft linking said first motor to said second motor.

13. The hoist system of claim 12, wherein said first and second motors are direct drive motors.

14. The hoist system of claim 12, wherein said control unit controls operation of said second motor, and stoppage of said first and second motors positions said hoist platform into a static position.

15. The hoist system of claim 14, wherein said control unit is programmed to instruct said first and second motors to accelerate and decelerate for soft starts and stops of said hoist platform.

16. A hoist drive system for a palletizer, the palletizer comprising:
    an infeed section which receives goods to be stacked in layers on a pallet;
    a hoist section comprising a vertically movable hoist platform, the hoist platform moving vertically to receive successive layers of goods; and
    an outfeed section which receives the layers of goods from the hoist section when a sufficient number of layers have been stacked on the hoist platform; and a hoist drive system according to claim 15 for vertically positioning the hoist platform.

17. The hoist drive system for a palletizer of claim 16:
wherein the gearbox drives a sprocket which in turn drives a chain, the chain coupled to the hoist platform.

18. The hoist drive system for a palletizer of claim 16:
wherein the first motor is an electric flux vector motor.

19. The hoist drive system for a palletizer of claim 16:
wherein the hoist platform is held in place under the force of the first motor while the second layer of goods is deposited on the hoist platform.

20. The hoist drive system for a palletizer of claim 19:
further comprising a safety brake for holding the position of the hoist platform without using any force from the first motor.

21. The hoist drive system for a palletizer of claim 16 wherein:
the control unit sends signals to drive the first motor to move the hoist platform vertically to a first vertical position for depositing a first layer of goods on the hoist platform, and the control unit sends signals to drive the first motor a predetermined number of revolutions as measured by the encoder to move the hoist platform vertically to a second position for depositing a second layer of goods on the hoist platform on top of the first layer.

22. The hoist drive system for a palletizer of claim 21:
wherein the first motor is an electric flux vector motor.

23. The hoist drive system for a palletizer of claim 21:
wherein the hoist platform is held in place at the second position under the force of the first motor while the second layer of goods is deposited on the hoist platform.

24. The hoist drive system for a palletizer of claim 23 further comprising a safety brake for holding the position of the hoist platform without using any force from the first motor.

25. A hoist drive system comprising:
a rotary first motor having a first output and a second output on opposite sides of the first motor; and
wherein the first and second outputs are each coupled to a hoist platform for vertically driving the hoist platform.

26. The hoist drive system of claim 25 wherein the first output of the first motor vertically drives a first side of the hoist platform, and the second output of the first motor vertically drives a second side of the hoist platform opposite the first side.

27. The hoist drive system of claim 26 further comprising:
a rotary second motor having a first output and a second output on opposite sides of the second motor;
wherein the second output of the second motor vertically drives the first side of the hoist platform and the first output of the second motor vertically drives the second side of the hoist platform.

28. The hoist drive system of claim 27 wherein the second output of the first motor and the second output of the second motor are connected together to ensure that the first motor and the second motor rotate at the same rate.

29. A hoist drive system for a palletizer, the palletizer comprising:
an infeed section which receives goods to be stacked in layers on a pallet;
a hoist section comprising a vertically movable hoist platform, the hoist platform moving vertically to receive successive layers of goods; and
an outfeed section which receives the layers of goods from the hoist section when a sufficient number of layers have been stacked on the hoist platform; and
a hoist drive system according to claim 21 coupled to the hoist platform for vertically driving the hoist platform.

30. The hoist drive system of claim 29 wherein the first motor is an electric flux vector motor.

31. The hoist drive system of claim 30 wherein the first motor stops rotating and applies a force to the hoist platform to retain its vertical position while a layer of goods is deposited thereon.

32. The hoist drive system of claim 29 wherein:
the first output drives a first shaft, the first shaft driving a first coupling system operatively connected to a first side of the hoist platform; and
the second output drives a second shaft, the second shaft driving a second coupling system operatively connected to a second side of the hoist platform substantially opposite the first side.

33. The hoist drive system of claim 32:
wherein the first coupling system comprises a first sprocket operatively connected to a first chain, the first chain operatively connected to the first side of the hoist platform; and
wherein the second coupling system comprises a second sprocket operatively connected to a second chain, the second chain operatively connected to the second side of the hoist platform.

34. The hoist drive system of claim 33:
wherein the first coupling system further comprises a first gearbox, the first shaft driving the first gearbox, the first gearbox in turn driving a third shaft extending at an angle of approximately 90° to the first shaft, the third shaft in turn driving the first sprocket; and
wherein the second coupling system further comprises a second gearbox, the second shaft driving the second gearbox, the second gearbox in turn driving a fourth shaft extending at an angle of approximately 90° to the second shaft, the fourth shaft in turn driving the second sprocket.

35. The hoist drive system of claim 34 wherein the first motor rotates around a motor axis, and the rotational axis of the first shaft and the rotational axis of the second shaft are generally parallel with the motor axis, the first shaft being directly coupled to the first gearbox, and the second shaft being directly coupled to the second gearbox.

36. The hoist drive system of claim 35 wherein the first motor is an electric flux vector motor.

37. The hoist drive system of claim 36 wherein the first motor stops rotating and applies a force to the hoist platform to retain its vertical position while a layer of goods is deposited thereon.

38. The hoist drive system of claim 32:
wherein the first coupling system comprises a first gearbox, the first shaft driving the first gearbox, the first gearbox in turn driving a third shaft extending at an angle of approximately 90° to the first shaft; and
wherein the second coupling system comprises a second gearbox, the second shaft driving the second gearbox, the second gearbox in turn driving a fourth shaft extending at an angle of approximately 90° to the second shaft.

39. The hoist drive system of claim 38 wherein the first motor rotates around a motor axis, and the rotational axis of the first shaft and the rotational axis of the second shaft are generally parallel with the motor axis, the first shaft being directly coupled to the first gearbox, and the second shaft being directly coupled to the second gearbox.

40. The hoist drive system of claim 39 wherein the first motor is an electric flux vector motor.

41. The hoist drive system of claim 40 wherein the first motor stops rotating and applies a force to the hoist platform to retain its vertical position while a layer of goods is deposited thereon.

42. The hoist drive system of claim 32 further comprising a second motor having a first output and a second output on opposite sides of the second motor, the second output of the first motor being coupled to the first output of the second motor, the second output of the second motor being coupled to the second shaft.

43. The hoist drive system of claim 42 wherein the first motor and the second motor are each electric flux vector motors.

44. The hoist drive system of claim 43 wherein at least the first motor stops rotating and applies a force to the hoist platform to retain its vertical position while a layer of goods is deposited thereon.

45. The hoist drive system of claim 32 wherein the first motor is an electric flux vector motor.

46. The hoist drive system of claim 32 wherein the first motor stops rotating and applies a force to the hoist platform to retain its vertical position while a layer of goods is deposited thereon.

* * * * *